United States Patent [19]

Zandee et al.

[11] Patent Number: 5,758,044
[45] Date of Patent: May 26, 1998

[54] METHOD AND APPARATUS FOR RENDERING USING A BAND BY BAND DEPTH ADJUSTMENT

[75] Inventors: James C. Zandee, Santa Clara; Steven P. Bischoff, San Jose, both of Calif.

[73] Assignee: Apple Computer, Inc., Cupertino, Calif.

[21] Appl. No.: 782,892

[22] Filed: Dec. 30, 1996

Related U.S. Application Data

[63] Continuation of Ser. No. 389,366, Feb. 16, 1995, abandoned.
[51] Int. Cl.⁶ ..................................................... G06K 15/00
[52] U.S. Cl. ............................... 395/115; 395/109; 395/117
[58] Field of Search ........................................ 395/102, 109, 395/112, 115, 116, 509, 510, 508; 358/296, 298, 502, 534, 540, 523; 345/509, 510, 508

[56] References Cited

U.S. PATENT DOCUMENTS 4,516,139  5/1985  Takiguchi ........................... 358/296
4,974,171  11/1990  Yeh et al. ........................... 395/100
5,125,072  6/1992  Ng ....................................... 395/112

FOREIGN PATENT DOCUMENTS 0262801  8/1887  European Pat. Off. ............... 395/109

*Primary Examiner*—Arthur G. Evans
*Attorney, Agent, or Firm*—Nancy R. Simon

[57] ABSTRACT

A method and apparatus for rendering using band by band depth adjustment preferably begins by recording extents for each object on a page. An extent indicates where color or non-color ink begins and ends on a page. Extent blocks are then created. An extent block is comprised of at least one extent of the same ink type. Next, a band is created for each extent block. The bit depth for each band is adjusted based upon the ink type associated with each extent block. If the ink is black or white, a band having a bit depth of one is created. If the ink is color or gray scale, the bit depth is adjusted to the proper depth for that band. An object or portion of an object is then rendered into a band having the necessary bit depth for that object.

25 Claims, 4 Drawing Sheets

METHOD AND APPARATUS FOR RENDERING USING A BAND BY BAND DEPTH ADJUSTMENT

This is a continuation of application Ser. No. 08/389,366, filed Feb. 16, 1995 now abandoned.

BACKGROUND OF THE INVENTION

1. Field of the Invention

The present invention relates to computer systems, and more particularly to output devices in computer systems. Still more particularly, the present invention relates to a method and apparatus for rendering using band by band depth adjustment.

2. Description of the Prior Art

As more and more printers have the ability to print documents in color or varying shades of gray (gray scale), in addition to black or white, the time it takes to print documents increases. A document is comprised of at least one page. A page is made up of at least one object. Objects are anything that can be drawn, and include text, rectangles, ovals, regions, polygons, and PixMaps, which can be used to represent a photographic image.

Documents with color or gray scale objects require a larger bit depth for rendering. Bit depth refers to the number of bits used to represent each pixel of the printed page. Black or white objects typically have a bit depth of 1, or 1 bit per pixel. Color or gray scale objects have a multi-bit depth, with gray scale typically requiring up to 8 bits per pixel, and color objects requiring up to 32 bits per pixel. When a document or page has color or gray scale objects together with black or white objects contained therein, an issue arises as how to handle the differing bit depths. Contemporary computer systems handle the varying bit depth one of two ways. Render an entire document at the largest bit depth, or render each page in the document at the largest bit depth required for that page.

Rendering an entire document or page at the same bit depth, however, makes the printing process slower. This is due to several factors. One factor is that some computer systems have limited amount of memory for rendering. As known in the art, a page is comprised of scan lines. During printing, scan lines are combined together into "bands". These bands are rendered in the amount of memory made available for that print job. As a result of the bit depth being greater for color and gray scale objects, the amount of data that must be rendered is greater. Thus, the number of bands increases, because the number of scan lines per band decreases. This means the time required to render a document increases, since more bands have to be rendered.

Once the bands are rendered, data concerning the print job is sent to the printer. A greater rendering depth also increases the amount of data sent to the printer since, as discussed above, the number of bands that are rendered is increased. Increasing the amount of data sent to a printer also slows the printing process down.

SUMMARY OF THE INVENTION

A method and apparatus for rendering using band by band depth adjustment preferably begins by recording extents for each object on a page. An extent indicates where color or non-color ink begins and ends on a page. Extent blocks are then created. An extent block is comprised of at least one extent of the same ink type. Next, a band is created for each extent block. The bit depth for each band is adjusted based upon the ink type associated with each extent block. If the ink is black or white, a band having a bit depth of one is created. If the ink is color or gray scale, the bit depth is adjusted to the proper depth for that band. An object or portion of an object is then rendered into a band having the necessary bit depth for that object.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
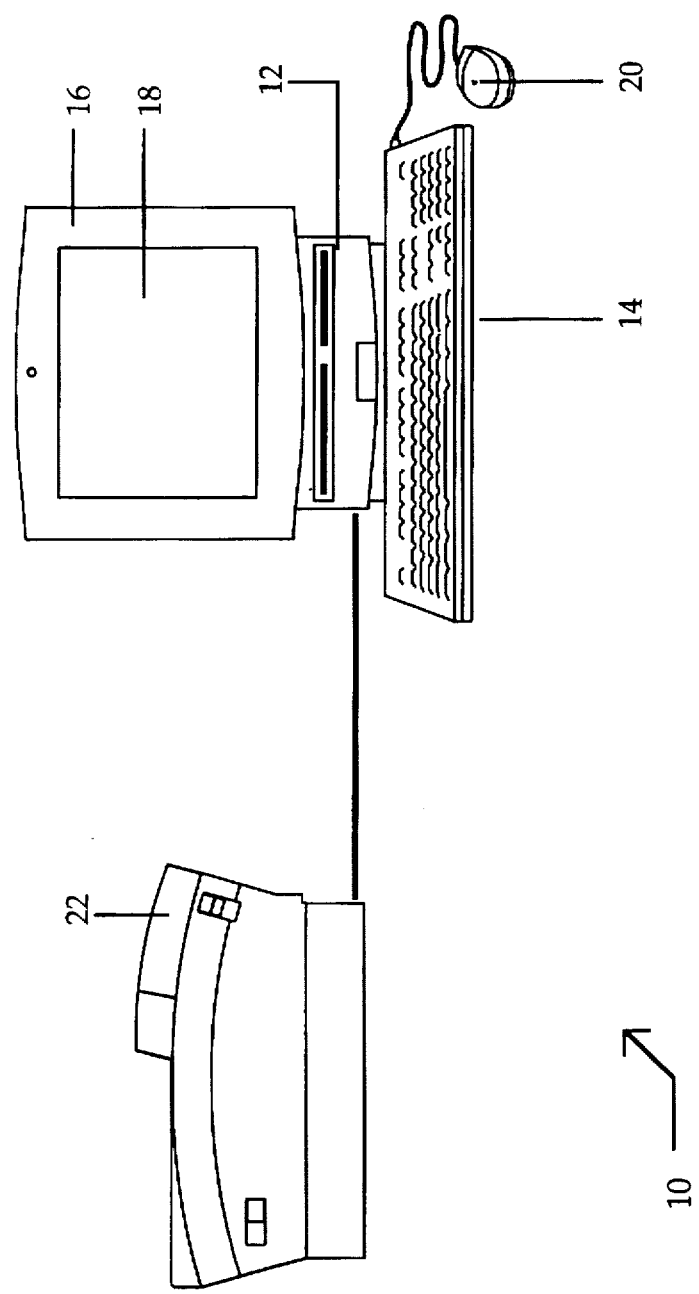
FIG. 1 is a pictorial illustration of a computer system which may be used to implement a method for rendering using band by band depth adjustment according to the present invention.

With reference now to the figures and in particular with reference to FIG. 1, a computer system is illustrated which may be used to implement the method for rendering using band by band depth adjustment according to the present invention. Computer system 10 includes a computer 12, keyboard 14, a monitor 16 having a display screen 18, a cursor control device 20, shown here as a mouse, and a printer 22. Computer system 10 may be implemented using any suitable computer, such as a Macintosh Quadra™ computer, a product of Apple Computer, Incorporated, located in Cupertino, Calif. Printer 22 is a color printer, such as a Color StyleWriter Pro™ printer, also a product of Apple Computer, Incorporated.

Included in computer system 10 is QuickDraw™, a collection of system software routines that an application can use to perform most image-manipulation operations on computer 12. The term "image" is preferably used to refer to a viewable image, i.e., an image as it is displayed on a display or printed on a page. The minimum information required to produce the image is typically stored in a pixel map. That is, all information concerning a particular pixel (intensity, color, etc.) is stored in a memory to "map" the information to that particular pixel.

Computer system 10 also includes a printer driver that corresponds to printer 22. A printer driver is a device driver, an independent software component that the system software in computer 12 uses to convert image data into printed output on printer 22. The printer driver preferably renders images in computer 12 using drawing commands, and then sends the rendered images to printer 22 in the form of pixel maps.

Other information available in computer 12 is information concerning the "objects" on a page that are used to ultimately create the image. In the preferred embodiment, objects are anything that can be drawn, and include text, rectangles, ovals, regions, polygons, and PixMaps. PixMaps contain pixel data, with a photographic image being one example of a PixMap.

In the preferred embodiment, the printer driver captures the objects of an entire page in a temporary disk file, called a spool file. This is accomplished by an application using QuickDraw™ low-level drawing routines to draw the images into a data structure known as a printing graphics port. As each page of a document is drawn into the printing graphics port, the printer driver translates the commands into the equivalent instructions for the printer, essentially translating the pixel maps and other objects into dot-placement instructions. These instructions are then sent to the printer, and the printer prints the images onto the page. For more information on QuickDraw™ and printer drivers, see *INSIDE MACINTOSH: Imaging with QuickDraw* (1994) and *INSIDE MACINTOSH: QuickDraw GX: Printing Extensions and Drivers* (1994), both by Apple Computer, Inc., which are incorporated by reference hereinto.

One advantage of having the printer driver control printing is that it introduces greater flexibility into the printing process. The printer driver can examine entire pages for their use of color, fonts, or other objects that need special processing prior to printing. Thus, the method for rendering using band by band depth adjustment preferably occurs before the printer driver renders any object on a page.

Figure 2:
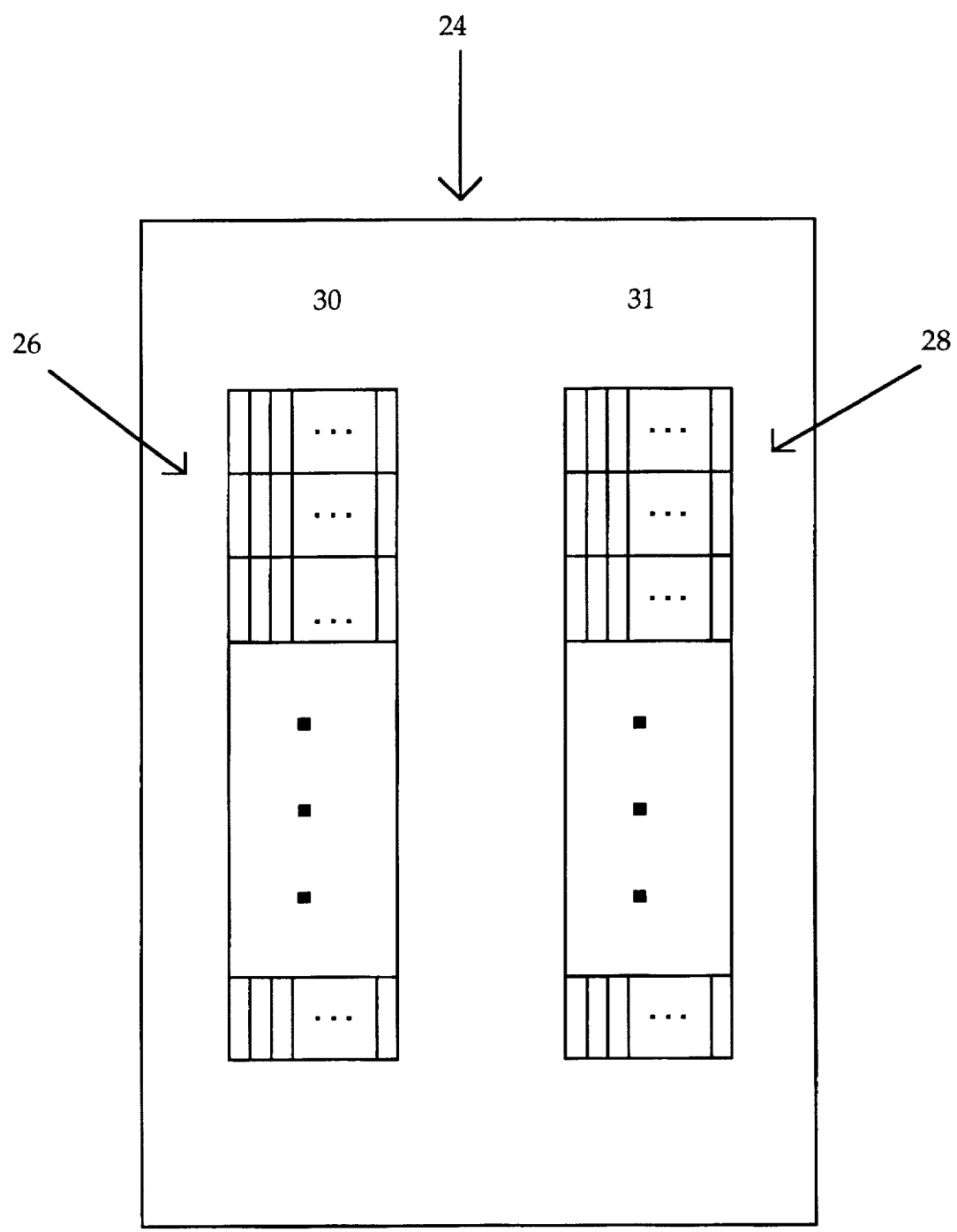
FIG. 2 is a pictorial representation of a page database used in implementing a method for rendering using band by band depth adjustment according to the present invention.

FIG. 2 is a pictorial representation of a page database used in implementing a method for rendering using band by band depth adjustment according to the present invention. A page database 24 preferably is a data structure that comprises two databases, an ink database 26 and a color ink database 28. Ink database 26 and color ink database 28 are preferably comprised of 32 bit words with one bit for each scan line. Alternatively, ink database 26 and color ink database 28 may be implemented using a single bit for multiple scan lines, thereby reducing memory consumption.

Ink database 26 is comprised of ink bits 30, where one ink bit exists for each scan line. Each ink bit 30 is used as a flag to indicate whether or not an object, or portion of an object, needs to be drawn on a corresponding scan line. Color ink database 28 is comprised of ink type bits 31, where an ink type bit is used to indicate whether an object is a color object. In the preferred embodiment, color objects are color and gray scale objects, and non-color objects are black or white objects. Thus, if an object on a scan line is black or white, the ink bit 30 that corresponds to that scan line is set to a value corresponding to ink, and the ink type bit 31 that corresponds to that scan line is set to a value indicating non-color.

If an object on a scan line is a color object, the ink bit 30 that corresponds to that scan line is set to a value corresponding to ink, and the ink type bit 31 that corresponds to that scan line is set to a value indicating color. Finally, if there is not an object on a scan line, ink bit 30 that corresponds to that scan line is set to a value corresponding to no ink. In this situation, the corresponding ink type bit 31 in color database 28 will not be examined when forming extent blocks.

Figure 3:
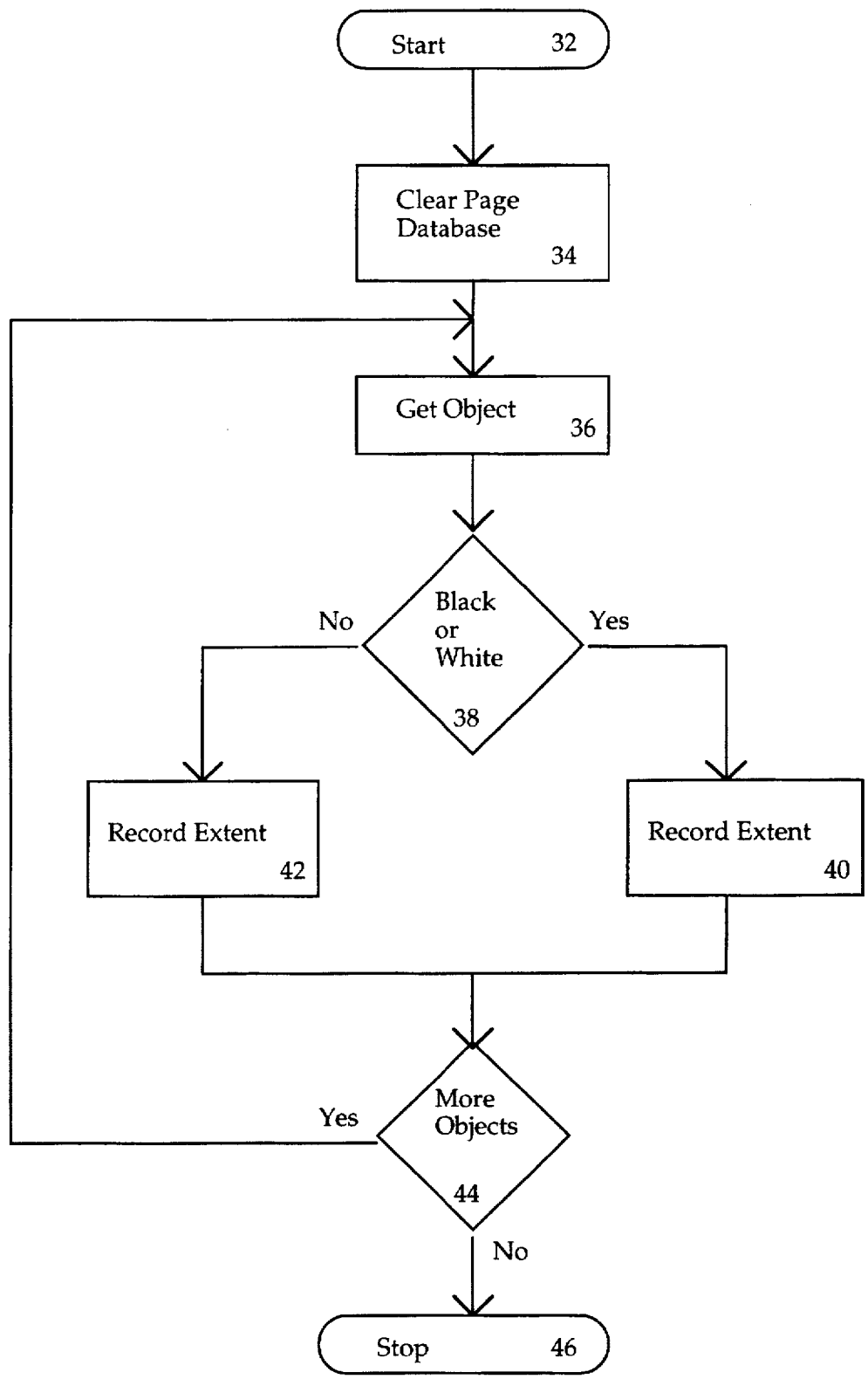
FIG. 3 is a flowchart depicting a method for building a page database according to the present invention.

Referring to FIG. 3, a flowchart depicts a method for building a page database according to the present invention. The method begins at block 32, and thereafter passes to block 34. Block 34 illustrates the step of clearing the page database so that preferably no information remains in the page database. As part of this clearing, all ink bits are preferably reset to a value corresponding to no ink. Next, an object to be rendered is obtained, as shown in block 36.

A determination is then made as to whether or not the object is a black or white object. In the preferred embodiment, this is accomplished by looking at the foreground and background color and the patterns (pen, background, and fill) associated with the object. For PixMap objects, the depth of the PixMap is also used to determine whether or not the object is a black or white object. This step is illustrated in block 38.

If the object is black or white, block 40 depicts the next step in the preferred embodiment, which is to record its extent in the ink database and the color ink database. The extent is defined by a boundary rectangle in the preferred embodiment. A boundary rectangle defines the area of an object. The upper-left corner of the boundary rectangle is aligned around the first bit in the object. The width of the boundary rectangle determines how many bits of one scan line are logically owned by the object. The height of the boundary rectangle determines how many scan lines are logically owned by the object. Thus, the scan line range begins at the first, or top, scan line in the boundary rectangle and ends at the last, or bottom scan line range in the boundary rectangle. This scan line range is the extent for an object.

Recording an extent for a non-color object involves setting the ink bit or bits in the ink database that correspond to the extent to a value corresponding to ink, and setting the ink type bit or bits that correspond to the extent to a value indicating non-color. In the preferred embodiment, an ink bit is set for each scan line. Alternatively, an ink bit can be set for a multiple number of scan lines. For example, a single ink bit can be used to indicate whether or not ink resides in any one of eight combined scan lines.

If the object is a color or gray scale object, the extent for the object is recorded at block 42. Recording an extent for a color object involves setting the ink bit or bits in the ink database that correspond to the extent to a value corresponding to ink, and setting the ink type bit or bits that correspond to the extent to a value indicating color. If a color object and a non-color object are both on a single scan line, the ink type bits in the color database are set to indicate color.

Block 44 depicts the next step, in which a determination is made as to whether or not there are more objects to be acquired. If there are more objects, the process returns to block 36. The method then cycles through blocks 36 through 44 until there are no more objects to acquire. The extent for each object on a page is recorded during this process. When there are no more objects, the method for building a page database ends, as shown in block 46.

Figure 4:
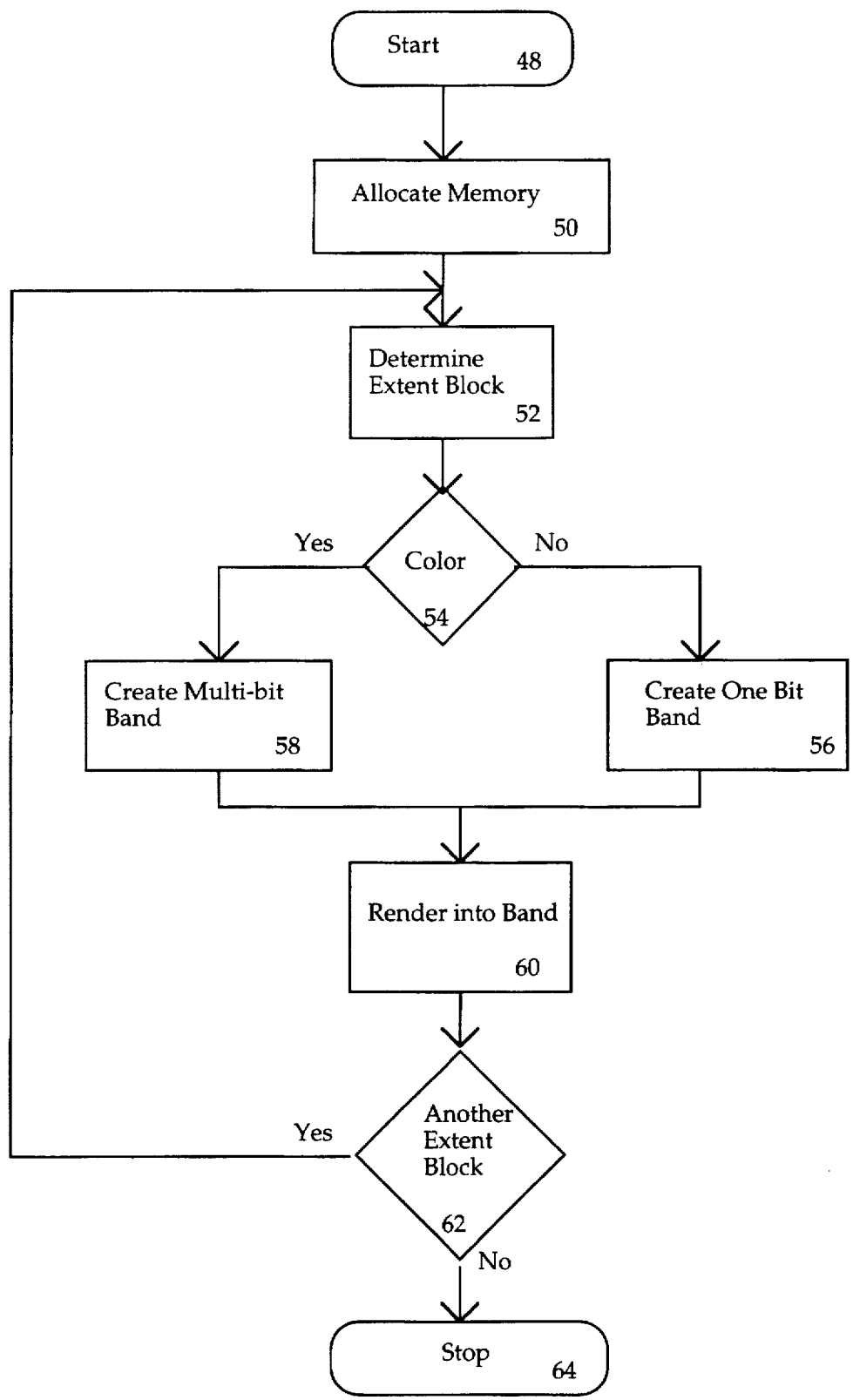
FIG. 4 is a flowchart illustrating a method for rendering using band by band depth adjustment according to the present invention.

FIG. 4 is a flowchart illustrating a method for rendering using band by band depth adjustment according to the present invention. In the preferred embodiment, the steps portrayed in FIG. 4 occur after the method for building the page database shown in FIG. 3 has been completed. The process begins at block 48, and thereafter passes to block 50, where memory is allocated for rendering. The amount of memory allocated is based on the amount of available RAM in the preferred embodiment. Next, an extent block is determined, as shown in block 52. An extent block is one or more extents of the same ink type combined together in order to indicate how far down a page contiguous objects of the same ink type reside on the page. An extent block is created by locating the first ink bit set to a value corresponding to ink and looking at each subsequent ink bit until an ink bit indicates there is no ink on a scan line. This is an ink bit range. The ink type bits that correspond to the ink bit range are then evaluated in order to determine whether or not the ink type changes in the ink bit range. If the ink type bits do not change, an extent block is created for that ink bit range. If the ink type bits do change, an extent block is created for each ink range that has the same ink type. In this manner, contiguous color objects or contiguous non-color objects are located on a page.

A determination is then made as to whether or not the extent block is color or non-color, as illustrated in block 54. If the extent block is not color, a band having a bit depth of one is created. This step is depicted in block 56. The one bit band is created by determining how many whole scan lines fit into the allocated memory at that time, in light of the bit depth for that band. How many whole scan lines will fit into the memory is determined by calculating the number of pixels in a scan line and the number of bits per pixel. The number of pixels in a scan line is calculated via the width of the paper to be used when printing. For non-color extent blocks, the bit depth is one bit per pixel. Based on those calculations, the number of scan lines that can fit into the allocated memory is determined.

Referring again to block 54, if the extent block is color, the process continues at block 58 with the creation of a multi-bit band. Again, the multi-bit band is created by determining how many whole scan lines fit into the allocated memory at that time. How many whole scan lines will fit into the memory is determined by calculating the number of pixels in a scan line and the number of bits per pixel. The number of pixels in a scan line is calculated via the width of the paper to be used when printing. The bit depth is determined by the preferred depth for gray scale or color printing for the printer. In the preferred embodiment, if the ink in the extent is gray scale, the bit depth for a band may involve up to 8 bits per pixel. If the extent is color ink, the bit depth for a band may involve up to 32 bits per pixel. In the preferred embodiment, the depth at which gray scale or color data is rendered is based on the user's choice for a particular print job and the capabilities of the printer's print engine. Based on these calculations, the number of scan lines that can fit into the allocated memory is determined.

Once the band is created, the object, or portion of an object, is rendered into the band, as shown in block 60. A determination is then made as to whether or not there are more extent blocks that need to be rendered. This step is illustrated in block 62. If there are more extent blocks, the process returns to block 52. The method cycles through blocks 52 through 62 until there are no more extent blocks that need to be rendered. As the rendering process works its way down the page, the bit depth of each band is adjusted in order to take maximum advantage of the available memory. When there are no more extent blocks to be rendered, the method for rendering using band by band depth adjustment ends, as shown in block 64.

One advantage to adjusting the bit depth on a band by band basis is that the speed of the printing process is increased. This is due to the fact that the minimum number of bands are created for a page. This makes the printing process more efficient, and therefore, faster.

Furthermore, the ability to perform white space skipping is maximized. White space skipping is a technique known in the art where gaps between objects, or white spaces, are skipped over. This allows the printer to advance the paper, thereby skipping over the white space. Maximizing the ability to perform white space skipping increases the efficient and speed of the printing process.

Minimizing the number of bands required for a page and white space skipping can result in another advantage, that of reducing the amount of data that is sent to the printer. Printing time is reduced by reducing the amount of data sent to the printer.

Another advantage is that the print modes of the engine can be changed during printing. This may allow the engine to use many more ink jets at a time, for instance. Objects that are black or white print faster than color objects. This also results in a page being printed faster.

While the invention has been particularly shown and described with reference to a preferred embodiment, it will be understood by those skilled in the art that various changes in form and detail may be made therein without departing from the spirit and scope of the invention. For example, the preferred embodiment has been described with reference to a Macintosh™ computer system. The present invention can be implemented on devices or other systems. Furthermore, the preferred embodiment has been described using Quick-Draw™ as the rendering system. Other rendering systems, however, can be used with the present invention. Finally, the preferred embodiment employs ink bits within the ink database to flag where ink resides on a page. The present invention may be implemented without an ink database however, since any database can be used so long as the extent of ink and color ink is recorded before rendering begins.

What is claimed is:

1. A method for rendering a page having at least one object on the page, said method comprising the steps of:

determining whether or not an object is a black or white object;

recording an extent for the object in a page database based upon the result of determining whether the object is black or white;

determining an extent block for at least one extent, wherein each extent block is comprised of extents having the same ink type;

creating a band for each extent block, wherein a bit depth for the band is adjusted to the proper depth based upon the ink type for the extent block; and rendering each object or portion of an object that corresponds to the extent block into the band.

2. A computer system having a computer and a printer, wherein a page to be printed on said printer has at least one object on the page, wherein said computer system comprises:

a storage medium, wherein an extent for each object on the page is recorded in the storage medium;

means for determining an extent block for at least one extent, wherein each extent block is comprised of extents having the same ink type;

means for creating a band for each extent block, wherein a bit depth for the band is adjusted to the proper depth based upon the ink type for the extent block; and means for rendering each object or portion of an object that corresponds to the extent block into the band.

3. A computer for rendering a page having at least one object on the page, wherein said computer comprises:

a storage medium, wherein an extent for each object on the page is recorded in the storage medium;

means for determining an extent block for at least one extent, wherein each extent block is comprised of extents having the same ink type;

means for creating a band for each extent block, wherein a bit depth for the band is adjusted to the proper depth based upon the ink type for the extent block; and means for rendering each object or portion of an object that corresponds to the extent block into the band.

4. A printer for printing a page having least one object on the page, wherein said printer comprises:

a storage medium, wherein an extent for each object on the page is recorded in the storage medium;

means for determining an extent block for at least one extent, wherein each extent block is comprised of extents having the same ink type;

means for creating a band for each extent block, wherein a bit depth for the band is adjusted to the proper depth based upon the ink type for the extent block; and means for rendering each object or portion of an object that corresponds to the extent block into the band.

5. A device driver for rendering a page comprising at least one object on the page, wherein an extent for each object on the page is recorded in a storage medium, wherein said printer driver comprises:

means for determining an extent block for at least one extent, wherein each extent block is comprised of extents having the same ink type; and means for creating a band for each extent block, wherein a bit depth for the band is adjusted to the proper depth based upon the ink type for the extent block.

6. The device driver of claim 5, further comprising means for allocating memory to be used to render the page.

7. The device driver of claim 6, wherein the means for creating a band for each extent block comprises means for creating a band for each extent block based upon the number of whole scan lines that can fit into the allocated memory.

8. The device driver of claim 5, further comprising means for rendering each object or portion of an object that corresponds to the extent block into the band.

9. The method of claim 1, further comprising the step of allocating memory to be used to render the page.

10. The method of claim 9, wherein the step of creating a band for each extent block comprises the step of creating a band for each extent block based upon the number of whole scan lines that can fit into the allocated memory.

11. The method of claim 1, further comprising the step of creating the page database.

12. The method of claim 11, wherein the step of creating the page database comprises the step of creating a page database having thirty-two (32) bit words with one bit for each scan line in the page.

13. The method of claim 12, wherein the step of creating a page database comprises the steps of:

creating an ink database; and creating an ink type database.

14. The computer system of claim 2, further comprising means for allocating memory to be used to render the page.

15. The computer system of claim 14, wherein the means for creating a band for each extent block comprises means for creating a band for each extent block based upon the number of whole scan lines that can fit into the allocated memory.

16. The computer system of claim 2, wherein an extent for each object on the page is recorded in a page database in the storage medium.

17. The computer system of claim 16, wherein the page database is comprised of thirty-two (32) bit words with one bit for each scan line in the page.

18. The computer of claim 3, further comprising means for allocating memory to be used to render the page.

19. The computer of claim 18, wherein the means for creating a band for each extent block comprises means for creating a band for each extent block based upon the number of whole scan lines that can fit into the allocated memory.

20. The computer of claim 3, wherein an extent for each object on the page is recorded in a page database in the storage medium.

21. The computer of claim 20, wherein the page database is comprised of thirty-two (32) bit words with one bit for each scan line in the page.

22. The printer of claim 4, further comprising means for allocating memory to be used to render the page.

23. The printer of claim 22, wherein the means for creating a band for each extent block comprises means for creating a band for each extent block based upon the number of whole scan lines that can fit into the allocated memory.

24. The printer of claim 4, wherein an extent for each object on the page is recorded in a page database in the storage medium.

25. The printer of claim 24, wherein the page database is comprised of thirty-two (32) bit words with one bit for each scan line in the page.

* * * * *